US012418968B2

(12) United States Patent
McCain et al.

(10) Patent No.: US 12,418,968 B2
(45) Date of Patent: Sep. 16, 2025

(54) VEHICLE LAMP ASSEMBLIES AND CONTROL METHODS

(71) Applicant: DIODE DYNAMICS, L.L.C., St. Charles, MO (US)

(72) Inventors: Paul McCain, St. Charles, MO (US); Cole Jackson, Cheshire, CT (US); Trevor Dobbins, St. Charles, MO (US)

(73) Assignee: DIODE DYNAMICS, L.L.C., St. Charles, MO (US)

( * ) Notice: Subject to any disclaimer, the term of this patent is extended or adjusted under 35 U.S.C. 154(b) by 219 days.

(21) Appl. No.: 18/233,832

(22) Filed: Aug. 14, 2023

(65) Prior Publication Data

US 2024/0057236 A1 Feb. 15, 2024

Related U.S. Application Data

(60) Provisional application No. 63/398,176, filed on Aug. 15, 2022.

(51) Int. Cl.
*H05B 47/155* (2020.01)
*B60Q 1/14* (2006.01)
*B60Q 1/22* (2006.01)
*B60Q 1/34* (2006.01)
*B60Q 1/44* (2006.01)
*B60Q 1/48* (2006.01)

(52) U.S. Cl.
CPC ........ *H05B 47/155* (2020.01); *B60Q 1/1415* (2013.01); *B60Q 1/34* (2013.01); *B60Q 1/44* (2013.01); *B60Q 1/22* (2013.01); *B60Q 1/48* (2013.01)

(58) Field of Classification Search
CPC ...... H05B 47/155; H05B 47/16; H05B 45/20; B60Q 1/1415; B60Q 1/34; B60Q 1/44; B60Q 1/22; B60Q 1/48; B60Q 1/0076; B60Q 1/2696; B60Q 3/80; B60Q 2900/10
See application file for complete search history.

(56) References Cited

U.S. PATENT DOCUMENTS

| | | | |
|---|---|---|---|
| 2017/0349093 A1* | 12/2017 | Peacock | B60Q 1/0088 |
| 2023/0336538 A1* | 10/2023 | Eckstein | H04L 63/20 |
| 2023/0421268 A1* | 12/2023 | Takata | H04B 10/11 |
| 2024/0014899 A1* | 1/2024 | Takata | H04B 10/1123 |
| 2024/0022509 A1* | 1/2024 | Mitchell | H04L 45/64 |

* cited by examiner

Primary Examiner — Abdullah A Riyami
Assistant Examiner — Syed M Kaiser
(74) Attorney, Agent, or Firm — Harness, Dickey & Pierce, P.L.C.

(57) ABSTRACT

Lamp assemblies and methods are provided for controlling one or more operating parameters of at least one controllable aftermarket light source of a vehicle. One example lamp assembly includes an aftermarket light source and a controller. The controller includes a storage medium configured to store a defined sequence and an operating variable. The controller is configured to capture an input signal sequence via at least one factory input device in the vehicle, determine whether the input signal sequence corresponds to the defined sequence, capture an input control signal via at least one factory input device in the vehicle, and in response to determining the input signal sequence corresponds to the defined sequence, modify the operating variable based on the input control signal. The operating variable is associated with an operating parameter of the aftermarket light source.

18 Claims, 8 Drawing Sheets

VEHICLE LAMP ASSEMBLIES AND CONTROL METHODS

CROSS-REFERENCE TO RELATED APPLICATION

This application claims the benefit of, and priority to, U.S. Provisional Application No. 63/398,176, filed Aug. 15, 2022. The entire disclosure of the above application is incorporated herein by reference.

FIELD

The present disclosure generally relates to vehicle lamp assemblies including controllers and controllable light sources, and to related control methods for controlling one or more operating parameters of vehicle light sources with factory installed input devices.

BACKGROUND

This section provides background information related to the present disclosure which is not necessarily prior art.

Vehicles are known to include factory lighting components installed by original equipment manufacturers. The factory installed lighting components are controlled through switches and/or on-board computers. In some modern vehicles, users may set operating parameters of the factory lighting components through dashboard interfaces in the vehicles. For example, users may select an accent color or an illumination time period for factory lighting components in vehicles.

Vehicles are also known to include aftermarket lighting components such as a lamp assembly installed by users after the purchase of the vehicles. The aftermarket lamp assembly receives power from a power source such as an alternator or battery via an existing electrical circuit (power and ground conductors) in the vehicle. Additionally, the aftermarket lamp assembly may include a microcontroller that allows users to modify a configuration value in the microcontroller and set an operating parameter of the assembly. Configuration of these microcontrollers are set by manipulating an aftermarket switching device at the assembly or an aftermarket switching device in a cab of the vehicle.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

An aftermarket lamp assembly for a vehicle is designed to have configurable operating parameters set by a controller through user manipulation of an aftermarket user control device such as a switch or a control panel. The control device is installed at the location of the controller such as on or in a casing of the lamp assembly outside a cab of the vehicle, or within the vehicle with an aftermarket wiring harness connecting the control device and the controller. As such, the aftermarket options of configurating the controller are inconvenient for users to access and/or involve additional components.

Uniquely, the lamp assemblies and methods herein enable a controller to adjust one or more operating parameters of aftermarket light sources of a vehicle through captured input signals from user selection of factory installed input devices in the vehicle. In particular, the controller may be configured capture an input signal sequence via at least one factory installed input device in the vehicle, determine whether the input signal sequence corresponds to a defined sequence, capture an input control signal via the same or different factory installed input device(s), and if the input signal sequence corresponds to the defined sequence, modify a stored operating variable associated with one or more operating parameters of the aftermarket light source. In this manner, configuration of the controller is accomplished through the sequential selection of existing, factory installed controls in the cab of the vehicle. As such, aftermarket devices such as switches, control panels, wiring harnesses, wireless devices, etc. are not required for configuration of the controller to adjust operating parameters of aftermarket light sources. Thus, the lamp assemblies and methods herein provide for an effective and convenient solution for modifying operating parameters through the use of factory installed controls.

Figure 1:
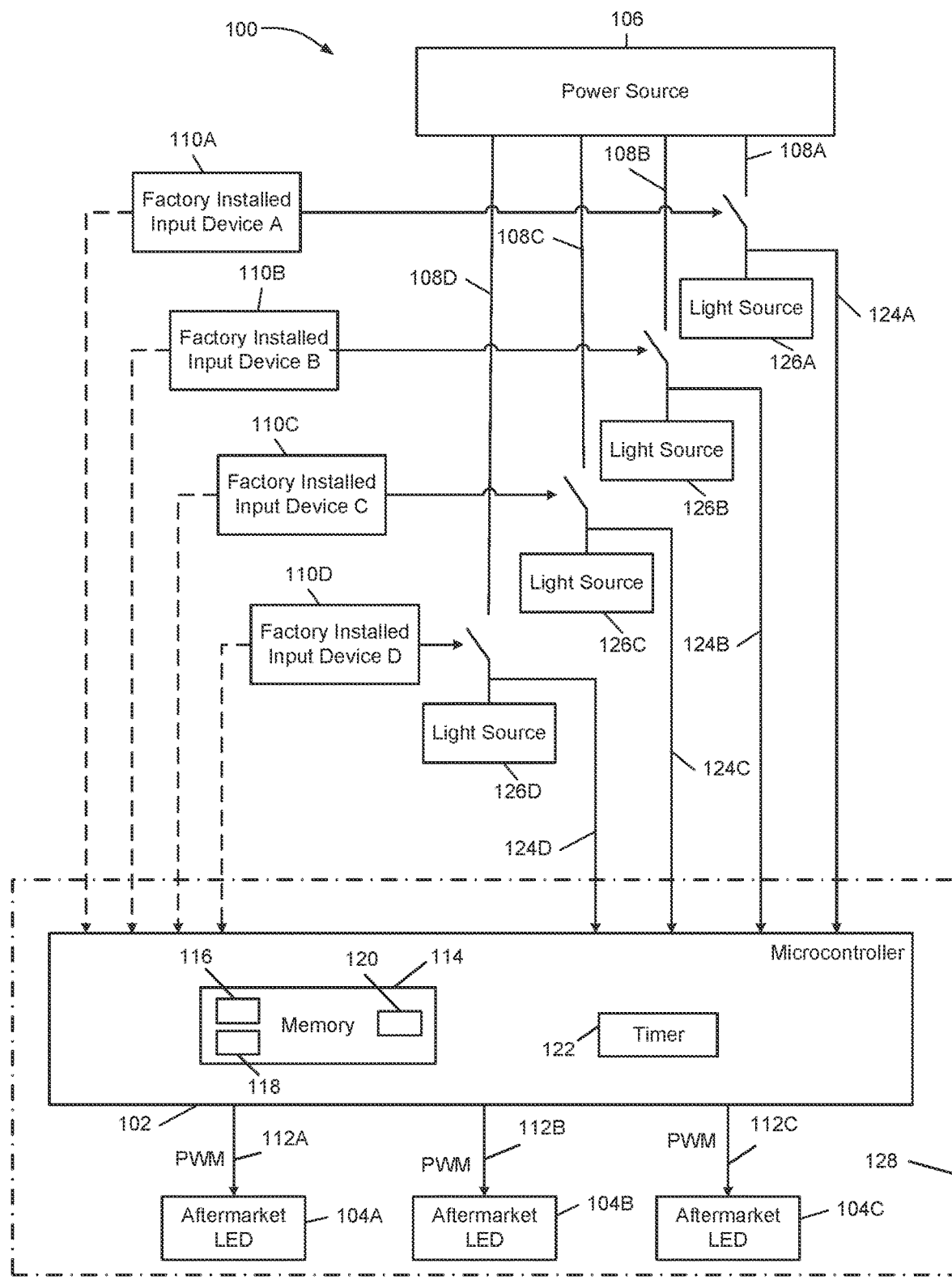
FIG. 1 is a block diagram of an example lamp assembly of the present disclosure, where the lamp assembly includes light sources and a controller suitable for controlling one or more operating parameters of the light sources.

FIG. 1 illustrates an example lamp system 100 in which one or more aspects of the present disclosure may be implemented. Although the lamp system 100 is presented in one arrangement, other embodiments may include lamp systems arranged otherwise depending on, for example, the number and/or types and/or configurations of controllable light sources employed in connection therewith.

In the illustrated embodiment, the lamp system 100 generally includes a controller 102 and multiple LEDs 104A-C coupled to the controller 102. The controller 102 and one or more of the LEDs 104A-C may be part of a lamp assembly 128, as indicated by the dashed box in FIG. 1. The controller 102 is configured to receive one or more input signals 124A-D based on a selection of factory installed input devices 110A-D and generate and output one or more control signals 112A-C (e.g., one or more PWM signals, etc.) to the LEDs 104A-C, thereby controlling one or more operating parameters of the LEDs 104A-C. The controller 102 and the LEDs 104A-C may be configured to receive power from a power source 106 via one or more power conductors.

Although the lamp assembly 128 (and/or the system 100) is shown with one controller 102, three control signals 112A-C, and three LEDs 104A-C in FIG. 1, it should be appreciated that more than one controller, more or less than three control signals, and/or more or less than three LEDs may be employed. For example, the lamp assembly 128 may include a single LED, two LEDs, four LEDs, multiple LEDs arranged in one or more LED arrays such as multi-die LED arrays, etc., and the controller 102 may generate and output control signals depending on, for example, the number of LEDs present in the assembly 128 and/or the number of controllable LED operating parameters available. Additionally, although the lamp assembly 128 of FIG. 1 is illustrated and described as including the LEDs 104A-C, it should be appreciated that another suitable type of controllable light source may be employed in the lamp assembly 128 and/or any other lamp assembly disclosed herein. For example, the lamp assembly 128 and/or any other lamp assembly disclosed herein may include one or more laser diodes and/or other suitable controllable light sources. In such examples, the laser diodes and/or other suitable light sources may include similar controllable operating parameters as explained herein.

The LEDs 104A-C of FIG. 1 may be employed in any suitable system as one or more light sources. For example, the LEDs 104A-C may be a light source of a vehicle, etc. In such examples, any one of the LEDs 104A-C may be a headlight (e.g., a low beam headlight, a high beam headlight, etc.), a parking light, a turn signal light, a light bar, a taillight, a dome light, a fog light, a decorative light, a cargo light, a puddle light, a mirror light, an auxiliary light, and/or another suitable exterior and/or interior vehicle light source. It should be appreciated that the dotted box in FIG. 1, designating the LED assembly 128, may indicate that the microcontroller 102 and aftermarket LEDs 104A-C (or more or less) are integrated, in whole or in part, in one or more assemblies. For example, any one or more of the LEDs 104A-C (and/or other suitable LEDs) and the controller 102 (and/or another suitable controller) may be integrated into a light source assembly (e.g., a headlight, etc.) of the vehicle.

With continued reference to FIG. 1, the LEDs 104A-C include one or more operating parameters which are controllable by the controller 102. The operating parameters represent output characteristics of the LEDs 104A-C. For example, and as further explained herein, the controllable operating parameters may include, without limitation, a color, a light intensity (e.g., brightness, etc.), a strobe mode, a beam pattern (e.g., directionality, etc.), an adaptive directionality (e.g., cornering or steering controls, etc.), light activation (e.g., when a light will activate, which emitters of a plurality of LEDs will activate, etc.), etc.

The LEDs 104A-C are aftermarket light sources. For example, the LEDs 104A-C may be light sources that are installed (e.g., by a user, a mechanic, etc.) in a system (e.g., a vehicle, etc.) after the system is manufactured, purchased, etc., as opposed to factory light sources which are installed by an original equipment manufacturer. In such examples, the aftermarket LEDs 104A-C may not be configured to interact with an existing on-board control in, for example, the vehicle. Although the lamp assembly 128 is described as including three controllable, aftermarket LEDs, it should be appreciated that other installed light sources, including aftermarket and/or factory installed light sources, may be implemented.

The controller 102 of FIG. 1 may include any suitable processing device. For example, the controller 102 may include, without limitation, a general purpose processor unit (CPU), a microcontroller, a reduced instruction set computer (RISC) processor, an application specific integrated circuit (ASIC), a programmable logic circuit (PLC), a programmable gate array (PGA), discrete circuitry, and/or any other circuit or processor capable of executing the functions described herein. The methods disclosed herein may be encoded as firmware into the controller 102 and/or executable instructions embodied in computer-readable media, contained within the controller 102, and/or separate from the controller 102 in one or more associated memory devices. In the illustrated embodiment of FIG. 1, the controller 102 is shown as a microcontroller.

The power source 106 may be any suitable source for providing power to the controller 102 and the LEDs 104A-C. For example, the power source 106 may be considered a primary power source which is configured to provide primary power to the controller 102 and the LEDs 104A-C during normal operations of the controller 102 and the LEDs 104A-C. In some embodiments, the power source 106 may be a factory power source in a vehicle such as an alternator and/or battery. In such embodiments, the controller 102 and the LEDs 104A-C may be configured to receive power from the factory power source via power conductors including one or more power and ground wires that are part of an existing power circuit in the vehicle.

In some embodiments, the controller 102 may be configured to receive power from one or more capacitors or other suitable passive devices when, for example, the power source 106 is disconnected from the controller 102. For example, the one or more capacitors may be configured to charge when the power source 106 is connected to the controller 102 and then discharge to the controller 102 after the power source 106 is disconnected. This may extend the time in which the controller 102 is powered based on, for example, the size of the capacitors. As such, the controller 102 may be provided additional time to complete functions after the power source 106 is disconnected.

The factory installed input devices 110A-D in the system 100 of FIG. 1 are configured to control power being supplied to or removed from vehicle light sources (e.g., factory installed light sources, etc.) 126A-D via power conductors 108A-D. For example, the input devices 110A-D are configured to control switching devices coupled between the power source 106 and the light sources 126A-D, as shown in FIG. 1. For instance, a user may select (e.g., manipulate, move, push, touch, etc.) the input device 110A. As a result, the corresponding switching device coupled between the power source 106 and the light source 126A closes, thereby providing power to the light source 126A via the power conductor 108A. If the input device 110A is selected again, the corresponding switching device opens, thereby removing (e.g., interrupting, etc.) power to the light source 126A.

The controller 102 is configured to receive or capture the input signals 124A-D based on the selection of the factory installed input devices 110A-D. For example, when the user selects the input device 110A, the input signal 124A is provided to the controller 102 or otherwise captured by the controller 102. More specifically, when the user selects the input device 110A, the corresponding switching device coupled between the power source 106 and the light source 126A is closed, thereby allowing power to flow to the light source 126A. When the switching device is closed, the controller 102 receives the input signal 124A. As such, in this example, the controller 102 is configured to capture input signals corresponding to the selection of the input devices 110A-D when power is provided to the light sources 126A-D.

In other embodiments, the controller 102 may be configured to capture input signals corresponding to the selection of the input devices 110A-D in another suitable manner. For example, the controller 102 may be configured to receive or capture input signals directly from the input devices 110A-D when the corresponding input devices 110A-D are selected, as shown by the dashed signals in FIG. 1. In other examples, the controller 102 may be configured to capture input signals by monitoring when the switching devices change state, detecting when power is removed from the light sources 126A-D, etc. Further, in some examples, the input signals 124A-D may be the same signals used to control the switching devices.

The factory installed input devices 110A-D may include any suitable control devices such as inputs on a control screen, moveable levers, buttons, pedals, switches, etc. Further, the factory installed input devices 110A-D may be used to control different lights in, for example, the vehicle. In such examples, any one of the input devices 110A-D may be a turn signal control, a headlight control, a hazard control, a high beam control, a parking light control, an auxiliary light control, a daytime running light (DRL) control, a brake light control (e.g., a brake pedal, etc.), a reverse light control (e.g., a shifter, etc.), etc.

As shown in FIG. 1, the controller 102 includes memory 114 and a timer 122. The memory 114 is configured to store a programming variable 116, one or more operating variables 118, and a defined programming sequence 120 (broadly, a defined sequence). In some embodiments, one or multiple operating variables 118 may be associated with one or more operating parameters of a different one of the LEDs 104A-C. The memory 114 may be any suitable storage medium configured to store data, computer executable instructions, etc. For example, the memory 114 may include, without limitation, RAM, ROM (e.g., EEPROM, etc.), etc. Although the controller 102 is shown as including the memory 114, it should be appreciated that the memory 114 may be a separate component and positioned external to the controller 102.

The controller 102 is configured to control one or more operating parameters of the LEDs 104A-C based on user selection of one or more of the factory installed input devices 110A-D. For example, the controller 102 may be configured to capture one or more of the input signals 124A-D based on the selection of the factory installed input devices 110A-D, and then use the captured input signal(s) as an input signal sequence. In such examples, a user may select one of the factory installed input devices 110A-D multiple times, sequentially select two or more of the factory installed input devices 110A-D, etc. More specifically, the user may select the input device 110A multiple times (e.g., 3 times, 5 times, etc.), may select the input device 110B one or more times and then select the input device 110C one or more times, etc.

The controller 102 is then configured to determine whether the input signal sequence corresponds to the defined programming sequence 120 and/or another programming sequence stored in the memory 114. For example, the controller 102 may compare the captured input signal sequence (or a representation thereof) to the defined programming sequence 120 (or a representation thereof). In some examples, the programming sequence 120 may be represented by a value stored in the memory 114 (e.g., a value of the programming variable 116, etc.). In such examples, the controller 102 may compare a representative value of the input signal sequence to the stored value representing the programming sequence 120 stored. In other examples, the controller 102 may adjust the value associated with the programming sequence 120 based on the input signal sequence, and then determine whether the input signal sequence corresponds to the programming sequence 120 if the adjusted value reaches a defined value. In either example, the controller 102 may be configured to modify the values in any suitable manner. For example, the controller 102 may be configured to increment or decrement a numerical value (e.g., 0 to 1, 3 to 6, 3 to 2, 9 to 6, etc.), increment or decrement an alphabetical value (e.g., A to D, Z to B, etc.), etc.

Once an appropriate input signal sequence is provided, the controller 102 may be configured to initiate operation of one or more actions. For example, and as further explained below, in response to the input signal sequence corresponding to the programming sequence 120, the controller 102 may be configured to be in a programming mode and then modify the operating variables 118, or directly modify the operating variables 118, thereby omitting the programming mode. In other examples, the controller 102 may be configured to be in a show mode if the input signal sequence corresponding to another programming sequence (e.g., defined show sequence, etc.). Regardless of the resulting action, the controller 102 does not commence until an appropriate input signal sequence is provided.

For example, the controller 102 may be in a programming mode based on a value of the programming variable 116. When the input signal sequence corresponds to the programming sequence 120, the controller 102 may be configured to modify (e.g., increment, decrement, adjust, etc.) a value of the programming variable 116. In such examples, the controller 102 may be configured to be in a programming mode when the value of the programming variable 116 is equal to a defined value (e.g., 2, 3, 4, D, Z, etc.). Once the controller 102 determines that the value of the programming variable 116 reaches the defined value (and is thereby in the programming mode), the controller 102 may be configured to modify at least one of the operating variables 118 as further explained below.

The use of the programming mode may be advantageous if, for example, multiple operating parameters are available for selection by a user. For example, if ten operating parameters are available for selection, the user may only need to input (via the factory installed input devices 110A-D) one input signal sequence corresponding to one programming sequence to allow the controller 102 to be in the programming mode. Subsequently, the user may then input (via the factory installed input devices 110A-D) one or more input control signals (as further explained below) to modify desired operating parameters.

In other embodiments, the controller 102 may directly modify the operating variables 118, thereby omitting the programming mode. In such examples, the controller 102 may be configured to automatically modify at least one of the operating variables 118 based on one or more input control signals (as further explained below) if the input signal sequence corresponds to the programming sequence 120. In some embodiments, omitting the programming mode may be beneficial if, for example, the number of selectable operating parameters is limited (e.g., two, three, etc. operating parameters).

Next, the controller 102 is configured to capture an input control signal based on one or more of the input signals 124A-D received during a selection of at least one of the input devices 110A-D. For instance, a user may select one of the input devices 110A-D one or more times, sequentially select two or more of the factory installed input devices 110A-D, etc. The controller 102 may then capture the corresponding input signal(s) 124A-D and use such signal(s) as the input control signal. In some examples, the input device or combination of input devices 110A-D selected by the user for the input control signal may be the same or different than the input device or combination of input devices 110A-D selected for the input signal sequence explained above. For example, if a user selects the input device 110B one or more times and then selects the input device 110C one or more times for the input signal sequence, the user may then select the input device 110A for the input control signal. In other examples, the user may select the input device 110B and/or the input device 110C for the input control signal.

The controller 102 is then configured to modify a value of one or more of the operating variables 118 based on the input control signal. In such examples, the controller 102 may be configured to modify the operating variable(s) 118 in any suitable manner. For example, the controller 102 may be configured to increment or decrement a numerical value (e.g., 0 to 1, 3 to 6, 3 to 2, 9 to 6, etc.), increment or decrement an alphabetical value (e.g., A to D, Z to B, etc.), etc.

The controller 102 is then configured to control one or more operating parameters of the LEDs 104A-C based on, for example, the values of the operating variables 118. For example, the controller 102 is configured to generate and output one or more of the control signals 112A-C to the corresponding LEDs 104A-C consistent with the current values of the operating variables 118. As such, one or more parameters of the control signals 112A-C may change as the values of the operating variables 118 are modified. In some embodiments where the control signals 112A-C are PWM signals, the controller 102 may be configured to change a pulse width, a duty cycle, etc. of the PWM signals, based on the current values of the operating variables 118.

The values of the operating variables 118 may correspond to different states of the operating parameters of the LEDs 104A-C. In such embodiments, a sequence of defined operating variable values may correspond to different states of the operating parameters of the LEDs 104A-C. For example, a first value (e.g., 1, A, etc.) of one of the operating variables may correspond to a first state (e.g., a first color, a first level of intensity, etc.) of an operating parameter of the LED 104A and a second value (e.g., 2, B, etc.) of the operating variable may correspond to a second state (e.g., a second color, a second level of intensity, etc.) of the operating parameter of the LED 104A. As an example, the operating parameter may be associated with the color provided by the LED 104A, the first value of the operating variable may correspond to the color blue, and the second value of the operating variable may correspond to the color red. In this example, the controller 102 may be configured to initially generate and output the control signal 112A to the LED 104A consistent with the first value, thereby adjusting the color of the LED 104A to blue. If the operating variable is modified to the second value, the controller 102 may be configured to generate and output the control signal 112A to the LED 104A consistent with the second value, thereby adjusting the color of the LED 104A to red.

With continued reference to FIG. 1, the controller 102 may be configured to control one or more of the LEDs 104A-C and/or another suitable light source to provide visual feedback to a user after successful completion of the programming sequence and/or the operating modification. For example, in the illustrated embodiment of FIG. 1, the controller 102 is configured to generate and provide a control signal to one or more of the LEDs 104A-C, to thereby causing the one or more of the LEDs 104A-C to provide an indication. In some examples, the controller 102 may be configured to generate and provide the control signal in response to the input signal sequence corresponding to the defined programming sequence. In other examples, the controller 102 may be configured to generate and provide the control signal in response to a successful modification of at least one of the operating variables 118. Additionally, the indication may be any suitable visual feedback such as, for example, flashing (e.g., rapidly, periodically, etc.) of the light source on and off one or more times, displaying the selected operating parameter or mode, etc. For example, if the controller 102 receives the appropriate input signal sequence and input control signal to switch a color of the LED 104A from amber to white, the LED 104A may flash a defined number of times (e.g., two, three, four, etc. times rapidly), and/or illuminate in the newly-configured amber color, etc., to indicate successful programming.

In some embodiments, the controller 102 of FIG. 1 may be configured to be in a show mode. For example, the controller 102 may be in the show mode when the captured input signal sequence corresponds to a defined show sequence (e.g., another programming sequence, etc.) stored in the memory 114. The controller 102 may determine whether the input signal sequence corresponds to the defined show sequence in a similar manner as explained above relative to the programming sequence 120. When the controller 102 is in the show mode, the controller 102 may be configured to control one or more of the LEDs 104A-C in a defined manner or an operating mode. For instance, one or more of the LEDs 104A-C may be controlled to progressively display different operating parameters, thereby allowing the user to view the different available options for selection. In other examples, one or more of the LEDs 104A-C may be controlled to display the different operating parameters in a defined pattern, thereby presenting a light show to the user.

The controller 102 is configured to resume normal operation based on a received signal or sequence of signals. For example, the controller 102 may be configured to capture a deactivation signal based on the selection of one or more of the factory installed input devices 110A-D. For instance, a user may select one of the factory installed input devices 110A-D, sequentially select two or more of the factory installed input devices 110A-D, etc. The controller 102 may then capture the corresponding input signal(s) 124A-D and use such signal(s) as a deactivation signal. In some examples, the input device or combination of input devices 110A-D selected by the user for the deactivation signal may be the same or different than the input device or combination of input devices 110A-D selected for the input signal sequence and/or the input control signal for modifying the operating variables 118. In response to the deactivation signal, the controller 102 may be configured to exit the programming mode, cease modification of the operating variables 118, resume normal operation, etc.

In other embodiments, the controller 102 may be configured to resume normal operation based on another parameter other than the deactivation signal. For example, the controller 102 may be configured to activate the timer 122 in response to determining that the input signal sequence corresponds to the defined programming sequence 120. If a defined period of time (e.g., 1 second, 2 seconds, 3 seconds, etc.) lapses before the input control signal is captured, the controller 102 may be configured to exit the programming mode, cease modification of the operating variables 118, resume normal operation, etc.

Although the controller 102 is shown and described as being configured to capture the input signals 124A-D based on the selection of the factory installed input devices 110A-D, it should be appreciated that other input devices such as aftermarket input devices may be implemented in conjunction with one or more of the factory installed input devices 110A-D. For example, the controller 102 may be configured to capture one or more input signals based on the selection of one or more of the factory installed input devices 110A-D and the selection of one of more aftermarket input devices, and then use such captured signal(s) as an input signal sequence and/or an input control signal, as explained herein.

Figure 2:
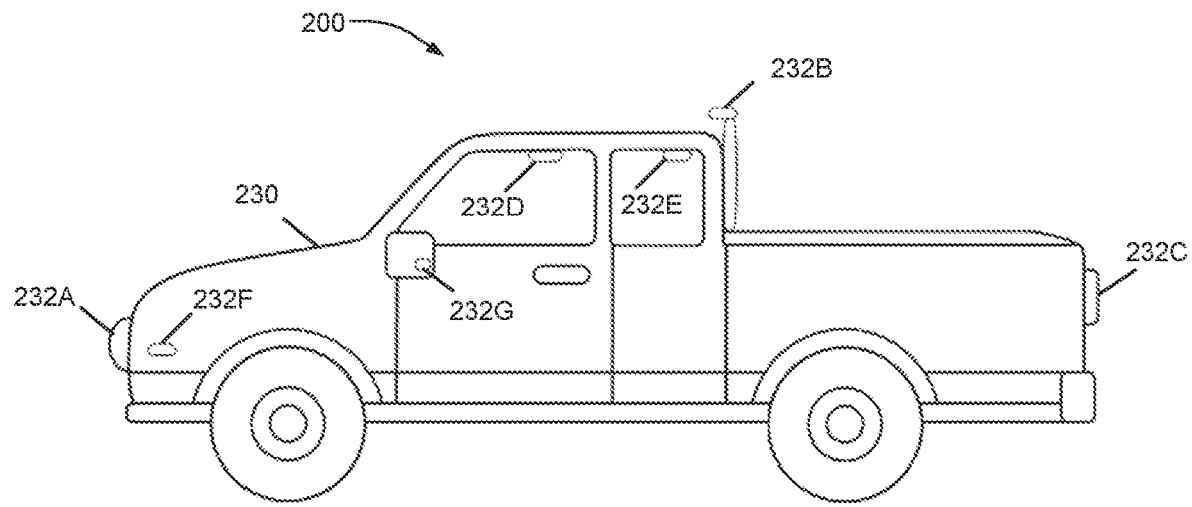
FIG. 2 is a diagram of an example system of the present disclosure, where the system includes a vehicle and lamp assemblies.

FIG. 2 illustrates an example system 200 in which one or more aspects of the present disclosure may be implemented. As shown in FIG. 2, the system 200 includes a vehicle 230 and multiple lighting components 232A, 232B, 232C, 232D, 232E, 232F, 232G coupled to the vehicle 230. In the system 200, the lighting components 232A, 232B, 232C, 232D, 232E, 232F, 232G represent a headlight (e.g., a low beam headlight, a high beam headlight, etc.), a light bar, a taillight, a front interior dome light, a rear interior dome light, a parking light, a sideview light, respectively, powered by a power source (e.g., the power source 106 of FIG. 1, etc.). In some embodiments, the power source 106 may be an existing alternator or battery (not shown) in the vehicle 230. Although the system 200 is presented in one arrangement, other embodiments may include lighting components arranged otherwise depending on, for example, vehicle design. Additionally, although the system 200 is shown in FIG. 2 as including a truck, it should be appreciated that the system 200 may include another type of consumer vehicle such as a car, a van, an ATV, a motorcycle, a watercraft, etc.

In the illustrated embodiment of FIG. 2, one or more of the lighting components 232A-E may be implemented with the lamp system 100 and/or assembly 128 of FIG. 1 or a portion thereof. In such examples, the lighting components 232A-E are configured to receive power from the existing alternator and/or battery in the vehicle 230. For example, the lighting component 232A may include the controller 102 and the LED 104A of FIG. 1 powered the existing alternator or battery, the lighting component 232B may include the controller 102 and the LED 104B of FIG. 1 the existing alternator or battery, and so on. In such embodiments, the LED (or an array of LEDs) in each lighting component 232A-E may be individually controlled with the controller 102 based on a selection of factory installed input devices (not shown) in the vehicle 230 (e.g., in a cab, interior portion, etc., of the vehicle 230) as explained above. In other embodiments, two or more of the lighting components 232A-E may be implemented with the lamp assembly 128 of FIG. 1. For example, the lighting components 232A, 232C, 232F may include the LEDs 104A, 104B, 104C, respectively, of FIG. 1. In such embodiments, the controller 102 of FIG. 1 may control the LEDs in the lighting components 232A, 232C, 232F separately or in conjunction as explained above.

Figure 3:
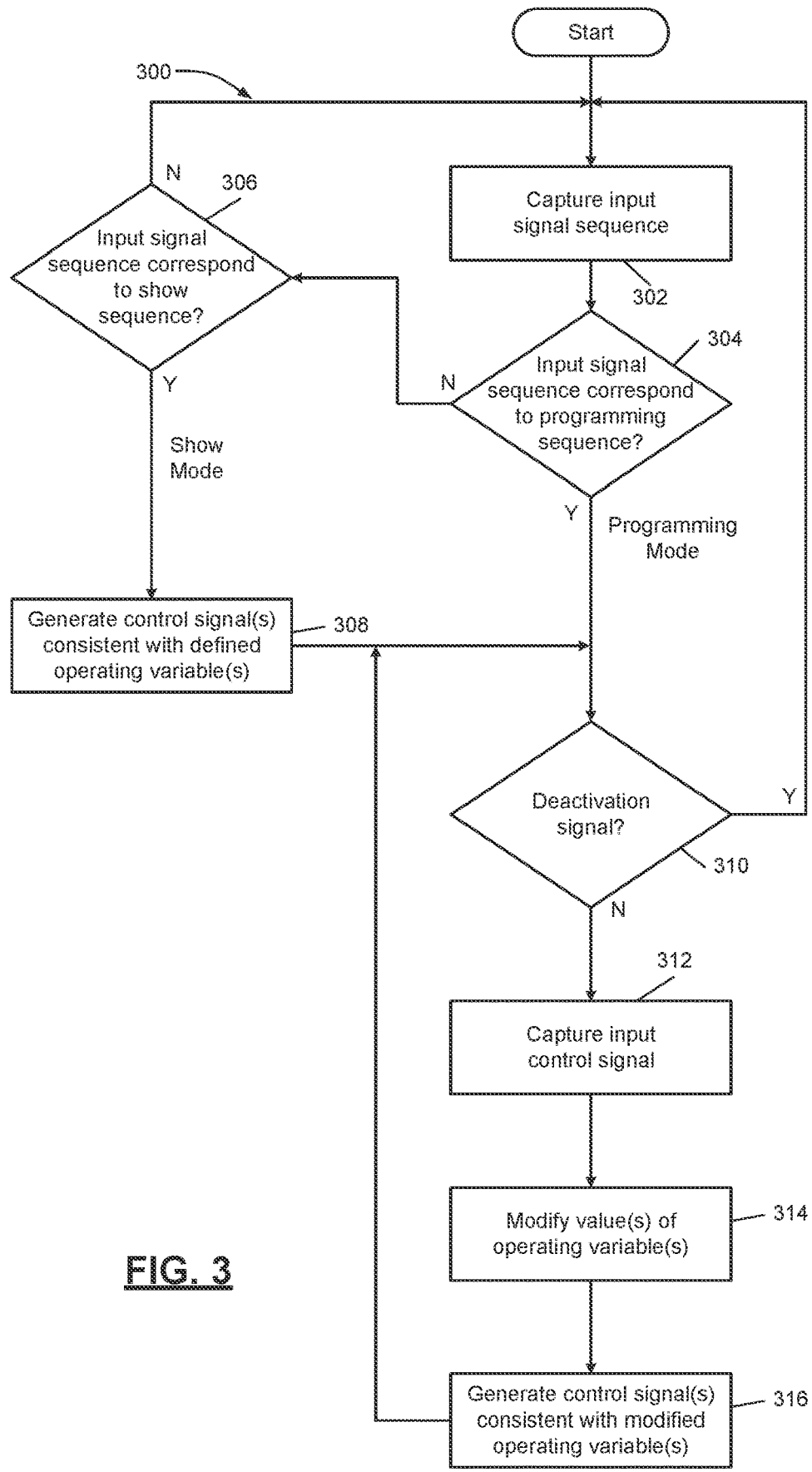
FIG. 3 is a flow diagram of an example control method that may be implemented in connection with the lamp assembly of FIG. 1.

FIG. 3 illustrates an example method 300 for use in controlling one or more operating parameters of at least one light source in a lamp assembly. The example method 300 is described with reference to the lamp system 100 and/or assembly 128 of FIG. 1. However, it should be understood that the method 300 is not limited to the lamp system 100 and/or assembly 128, as the method 300, for example, may be implemented, at least in part, in another suitable lamp assembly. Likewise, the lamp systems and/or assemblies herein including the lamp assembly 128 should not be understood to be limited to the example method 300.

In the example method 300, control of the one or more operating parameters of at least one of the LEDs 104A-C is based on input signals (e.g., an input signal sequence, an input control signal, a deactivation signal, etc.) provided through user selection of one or more of the factory installed input devices 110A-D as explained above.

The method 300 of FIG. 3 may begin when the controller 102 receives power from the power source 106. While powered, the controller 102 captures an input signal sequence at 302. For example, a user may select one of the factory installed input devices 110A-D multiple times, sequentially select two or more of the factory installed input devices 110A-D, etc. The controller 102 then captures corresponding input signal(s) 124A-D based on the selection of one or more of the factory installed input devices 110A-D and uses such signal(s) as an input signal sequence, as explained above.

Next, at 304, the controller 102 determines whether the input signal sequence corresponds to the defined programming sequence 120 stored in the memory 114. For example, the controller 102 may compare the input signal sequence (or a representation thereof) to the defined programming sequence 120 (or a representation thereof), as explained above. If the input signal sequence corresponds to the defined programming sequence 120 at 304, control proceeds to 310. In some examples, the controller 102 may or may not be in a programming mode after it determines the input signal sequence corresponds to the defined programming sequence 120, as explained above.

If, however, the input signal sequence does not correspond to the defined programming sequence 120 at 304, control proceeds to 306 where the controller 102 determines whether the input signal sequence corresponds to a defined show sequence stored in the memory 114. For example, the controller 102 may compare the input signal sequence (or a representation thereof) to the defined programming sequence 120 (or a representation thereof), as explained above. If the input signal sequence does not correspond to the defined show sequence at 306, control returns to 302.

If the input signal sequence corresponds to the defined show sequence at 306, control proceeds to 308 where the controller 102 generates one or more of the control signals 112A-C consistent with defined operating variables associated with the desired operating parameters of the LEDs 104A-C. As a result, one or more of the LEDs 104A-C may activate according to a defined operating mode, thereby presenting a specific, user defined lighting animation. Control then proceeds to 310.

At 310, the controller 102 reacts to whether a deactivation signal is received. For example, a user may select one of the factory installed input devices 110A-D, sequentially select two or more of the factory installed input devices 110A-D, etc. The controller 102 may then capture corresponding input signals based on the user selection and use such signal(s) as a deactivation signal, as explained above. If the controller 102 captures a deactivation signal at 310, the controller 102 resumes normal operation (e.g., is no longer in a programming mode, etc.) until the next input signal sequence is captured at 302. In some embodiments, the controller 102 may additionally reset one or more values of variables (e.g., the programming variable 116 of FIG. 1, etc.) in the memory 114 to default values in response to the deactivation signal.

If no deactivation signal is received by the controller 102, control proceeds to 312 where the controller 102 captures an input control signal. For example, while the controller 102 is powered, a user may select one of the factory installed input devices 110A-D multiple times, sequentially select two or more of the factory installed input devices 110A-D, etc. When one or more of the factory installed input devices 110A-D are selected, the controller 102 captures corresponding input signal(s) 124A-D, which represents the input control signal, as explained above.

In some embodiments, control may return to 302 even if a deactivation signal is not received by the controller 102 at 310. For example, the controller 102 may activate the timer 122 in response to determining that the captured input signal sequence corresponds to the defined programming sequence 120. If a defined period of time (e.g., 1 second, 2 seconds, 3 seconds, etc.) lapses before an input control signal is received at 312, the controller 102 may resume normal operation until the next input signal sequence is received at 302.

Next, at 314, the controller 102 modifies at least one of the operating variables 118 stored in the memory 114. For example, the controller 102 may modify one or more values of the operating variables 118 in response to and based on the captured input control signal. In such examples, the controller 102 may be configured to modify the values of the operating variables 118 in any suitable manner. For example, the controller 102 may be configured to increment a value (e.g., 0 to 1, 3 to 6, etc.), decrement a value (e.g., 3 to 2, 9 to 6, etc.), change an alphabetical value (e.g., A to D, Z to B, etc.), etc.

Next, at 316, the controller 102 generates a control signal consistent with the modified operating variables, and then provides the control signal to the desired LED. As a result, the LED may activate according to the modified operating variables, as explained above. Control then returns to 310.

FIGS. 4-8 illustrate example methods 400, 500, 600, 700, 800 for use in controlling one or more particular operating parameters of one or more aftermarket light sources in a lamp assembly. The example methods 400, 500, 600, 700, 800 are generally described with reference to the lamp system 100 and/or the assembly 128 of FIG. 1. However, it should be understood that the methods 400, 500, 600, 700, 800 are not limited to the lamp system 100 and/or assembly 128, as the methods 400, 500, 600, 700, 800, for example, may be implemented, at least in part, in another suitable lamp assembly. Likewise, the lamp assemblies herein including the lamp system 100 and/or assembly 128 should not be understood to be limited to the example methods 400, 500, 600, 700, 800. Additionally, although the methods 400, 500, 600, 700, 800 refer to the control of particular aftermarket light sources, it should be appreciated that the methods 400, 500, 600, 700, 800 may control other aftermarket light sources if desired.

Figure 4:
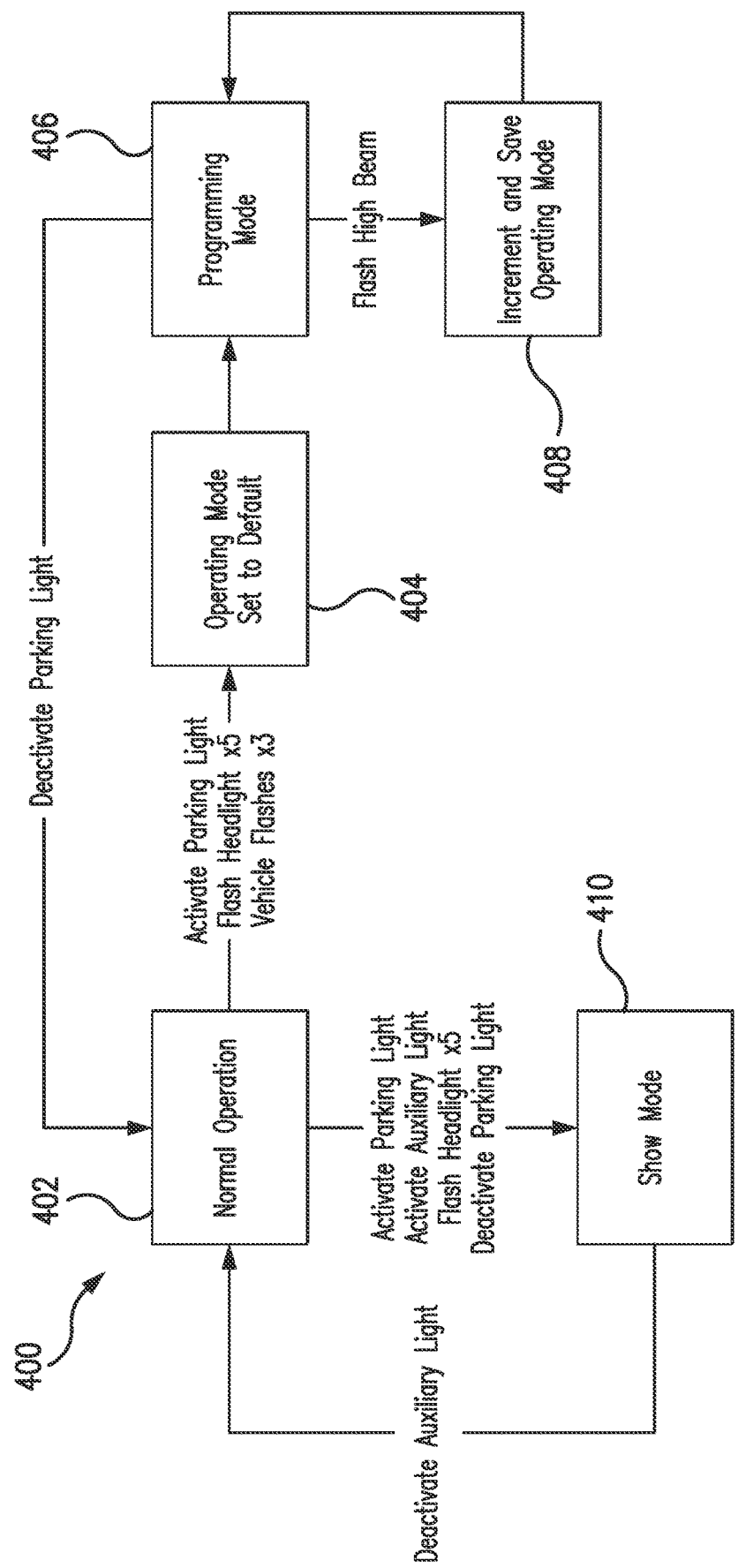
FIG. 4 is a flow diagram of another example control method that may be implemented in connection with the lamp assembly of FIG. 1.

In the illustrated embodiment of FIG. 4, the method 400 provides selectable options for collectively controlling the color of parking lights and DRLs, the activation mode of two accent lights, and enabling or disabling a startup sequence function. The parking lights, the DRLs, and the accent lights of FIG. 4 may be, for example, any one of the LEDs 104A-C of FIG. 1 controlled by the controller 102. In the example of FIG. 4, the method 400 employs a logic table stored in the memory 114 to cycle through possible configurations (e.g., modes, etc.) of multiple operating parameters, rather than controlling individual operating parameters. One exemplary logic table is shown below as Logic Table 1. This may be preferable in certain situations where the number of factory installed input devices is limited.

The method 400 begins at 402 where the controller 102 is in its normal operating mode. Next, the user selects two factory installed input devices and the controller 102 captures corresponding input signals based on the user selection, as explained above. The captured input signals are equivalent to an input signal sequence. For example, in FIG. 4, the user, through selection of associated factory installed input devices, may activate (e.g., turn on, power, etc.) the parking lights and then repeatedly activate and deactivate the headlights (e.g., low beam headlights, etc.) five times, thereby cycling power to and flashing the headlights five times. The activation and deactivation of the headlights may be done so rapidly to ensure the power is cycled five times within a defined period of time (e.g., as determined by the controller 102). For example, each power cycle resulting in the flash of the headlights may be about 250 milliseconds, 500 milliseconds, etc. In some examples, both the activation of the parking lights and then subsequent flashing of the headlights may be considered the input signal sequence. In other examples, only the flashing of the headlights may be considered the input signal sequence. In such examples, the activation of the parking lights may provide initial power to the controller 102.

If the input signal sequence corresponds to the programming sequence 120, the controller 102 may perform several functions. For example, the controller 102 may generate one or more control signals to cause one or more controllable lights (e.g., one or more turn signals, etc.) to flash, for example, three times, thereby indicating a programming sequence has been successfully entered. Additionally, the controller 102 may set the configuration to a default setting in 404. At this time, the controller 102 is also in a programming mode, as depicted in 406.

Next, while the controller 102 is in the programming mode, a user may modify a current configuration by selecting a factory installed input device associated with a high beam function to activate the high beam lights. In such examples, the selection of the factory installed input device (and activation of the high beam lights) corresponds to an input control signal provided to the controller 102. As such, the flashing of the high beam lights causes the controller 102 to increment one or more operating variables associated with the configurations, thereby incrementing the configuration selection in 408. The new configuration is saved and remains stored until a new selection is made (e.g., another flashing of the high beam lights, etc.), or until the controller 102 is once again in the programming mode.

As one example, the current configuration may be configuration 1 shown in Logic Table 1 below in which the parking lights are amber, the DRLs are white, the amber accent light bar is on, the white accent light bar is on, and the startup sequence function is on. If the high beam lights are flashed while the controller 102 is in the programming mode, the controller 102 increments to configuration 2 in the Logic Table 1. In configuration 2, the parking lights are amber, the DRLs are amber, the amber accent light bar is on, the white accent light bar is on, and the startup sequence function is on. This incrementation of the configuration of multiple operating parameters may continue each time the user flashes the high beam lights while the controller 102 is in the programming mode.

Logic Table 1

|  | Park (SEL) | DRL (SEL) | Amber Bars | White Bars | Start-up Pattern |
|---|---|---|---|---|---|
| Configuration 1 | Amber | White | ON | ON | ON |
| Configuration 2 | Amber | Amber | ON | ON | ON |
| Configuration 3 | White | White | ON | ON | ON |
| Configuration 4 | White | Amber | ON | ON | ON |
| Configuration 5 | Amber | White | ON | ON | OFF |
| Configuration 6 | Amber | Amber | ON | ON | OFF |
| Configuration 7 | White | White | ON | ON | OFF |
| Configuration 8 | White | Amber | ON | ON | OFF |
| Configuration 9 | Amber | White | OFF | OFF | ON |
| Configuration 10 | Amber | Amber | OFF | OFF | ON |
| Configuration 11 | White | White | OFF | OFF | ON |
| Configuration 12 | White | Amber | OFF | OFF | ON |
| Configuration 13 | Amber | White | OFF | OFF | OFF |
| Configuration 14 | Amber | Amber | OFF | OFF | OFF |
| Configuration 15 | White | White | OFF | OFF | OFF |
| Configuration 16 | White | Amber | OFF | OFF | OFF |

The user may cause the controller 102 to no longer be in the programming mode by deactivating the parking lights through selection of the associated factory installed input device. In such examples, the deactivation of the parking lights (e.g., removal of power, etc.) equates to a deactivation signal for the controller 102. The method 400 then returns to 402 where the controller 102 is in its normal operating mode.

In the method 400 of FIG. 4 may also include a show mode option. For example, the user may select three factory installed input devices to provide another input signal sequence to the controller 102. Specifically, in FIG. 4, the user may activate the parking lights, activate an auxiliary light, repeatedly activate/deactivate the headlights (e.g., low beam headlights, etc.) five times, and then deactivate the parking lights. In some examples, the activation of the parking lights and the auxiliary light, subsequent flashing of the headlights, and deactivation of the parking lights may collectively be considered the input signal sequence. In other examples, only the activation of the auxiliary light, subsequent flashing of the headlights, and deactivation of the parking lights may be considered the input signal sequence. In such examples, the activation of the parking lights may provide initial power to the controller 102.

If the input signal sequence corresponds to a stored show sequence, the controller 102 may be in a show mode as depicted in 410. When in the show mode, the controller 102 generates one or more control signals to cause the headlights to present a show by displaying various lighting animations. This may continue until the auxiliary light is deactivated. The method 400 then returns to 402 where the controller 102 is in its normal operating mode.

Figure 5:
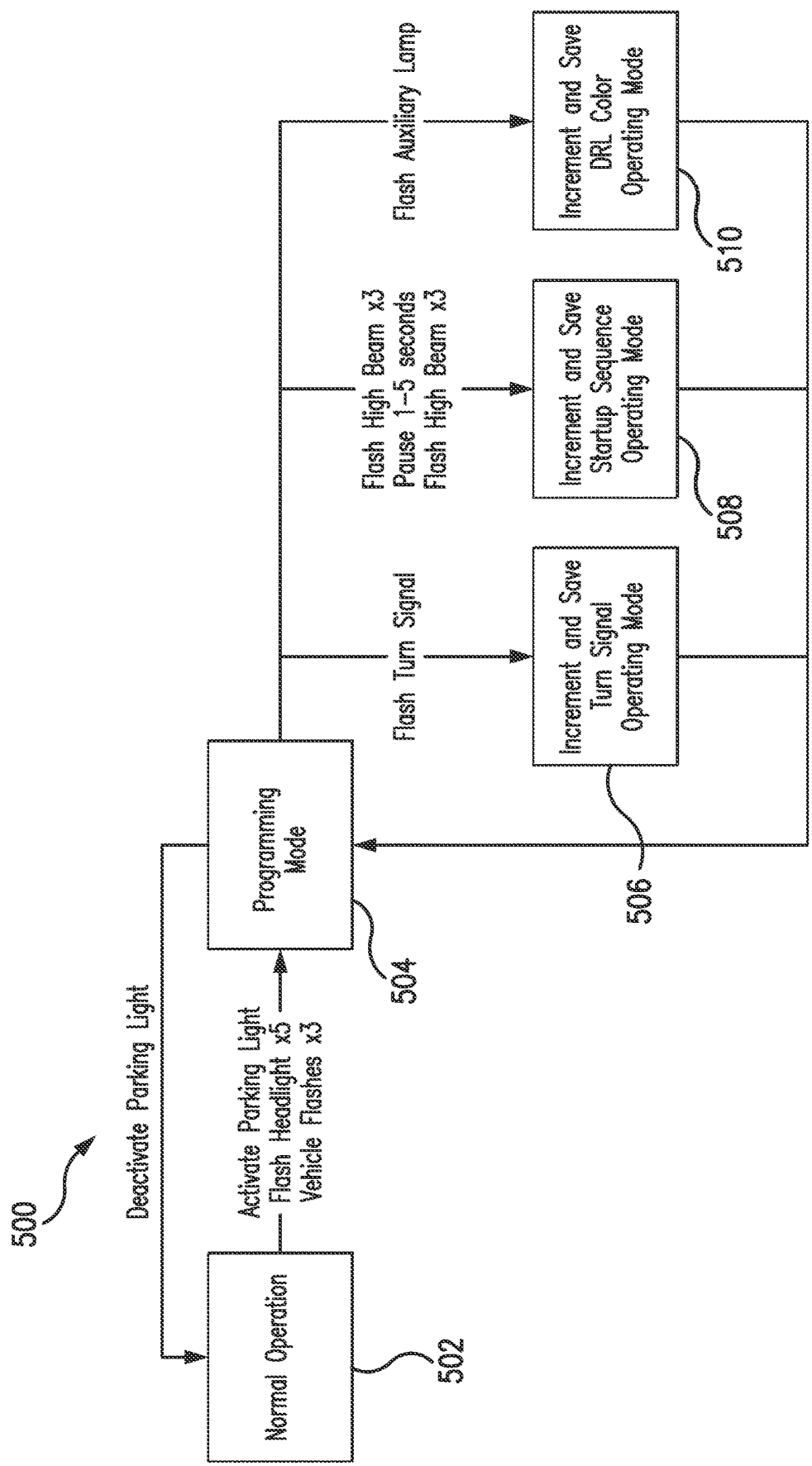
FIG. 5 is a flow diagram of another example control method that may be implemented in connection with the lamp assembly of FIG. 1.

In the illustrated embodiment of FIG. 5, the method 500 provides selectable options for individually controlling the color of DRLs, the enablement/disablement of a sequential turn signal function, and the enablement/disablement of a startup sequence function. In the example of FIG. 5, the method 500 allows a user to provide successive individual inputs to direct changes in an operating parameter of a corresponding lighting function, rather than collecting controlling configurations of multiple operating parameters as in the method 400 of FIG. 4.

The method 500 begins at 502 where the controller 102 is in its normal operating mode. Next, the user selects two factory installed input devices and the controller 102 captures input signals corresponding to the selected devices, whereby the input signals are equivalent to an input signal sequence, as explained herein. The input signal sequence of FIG. 5 is the same input signal sequence described above relative to FIG. 4. For example, in FIG. 5, the user activates the parking lights and then repeatedly activates and deactivates the headlights (e.g., low beam headlights, etc.) five times.

If the input signal sequence corresponds to the programming sequence 120, the controller 102 may generate one or more control signals to cause one or more controllable lights (e.g., one or more turn signals, etc.) to flash, for example, three times, thereby indicating a programming sequence has been successfully entered. Additionally, at this time, the controller 102 is also in a programming mode, as depicted in 504.

Next, while the controller 102 is in the programming mode, a user may modify the color of the DRLs, enable or disable the sequential turn signal function, and/or enable or disable the startup sequence function by selecting different factory installed input devices. The selection of the factory installed input devices provide different input control signals to the controller 102, which in turn causes the controller 102 to modify associated operating variables. For example, the user may alternate selection of the sequential turn signal function in 506 by activating and deactivating the turn signal using the hazard button. The user may also alternate selection of the startup sequence in 508 by cycling power three times to the high beam headlights, waiting at least one but less than five seconds, and then cycling power three times to the high beam headlights again. Based on the selected startup sequence, a particular lighting animation of one or multiple lighting sources may be displayed when, for example, the vehicle is started or the vehicle is unlocked. Further, the user may change the color (e.g., from amber to white, from white to amber, from blue to white, etc.) of the DRL in 510 by flashing the auxiliary lamp. In some examples, the controller 102 may generate one or more control signals to cause the parking lights to flash three times rapidly, the auxiliary lamp to flash two times, etc. to indicate successful programming.

The user may cause the controller 102 to no longer be in the programming mode by deactivating the parking lights through selection of the associated factory installed input device(s) and/or removing power to the controller 102. In such examples, the deactivation of the parking lights equates to a deactivation signal for the controller 102. The method 500 then returns to 502 where the controller 102 is in its normal operating mode.

Figure 6:
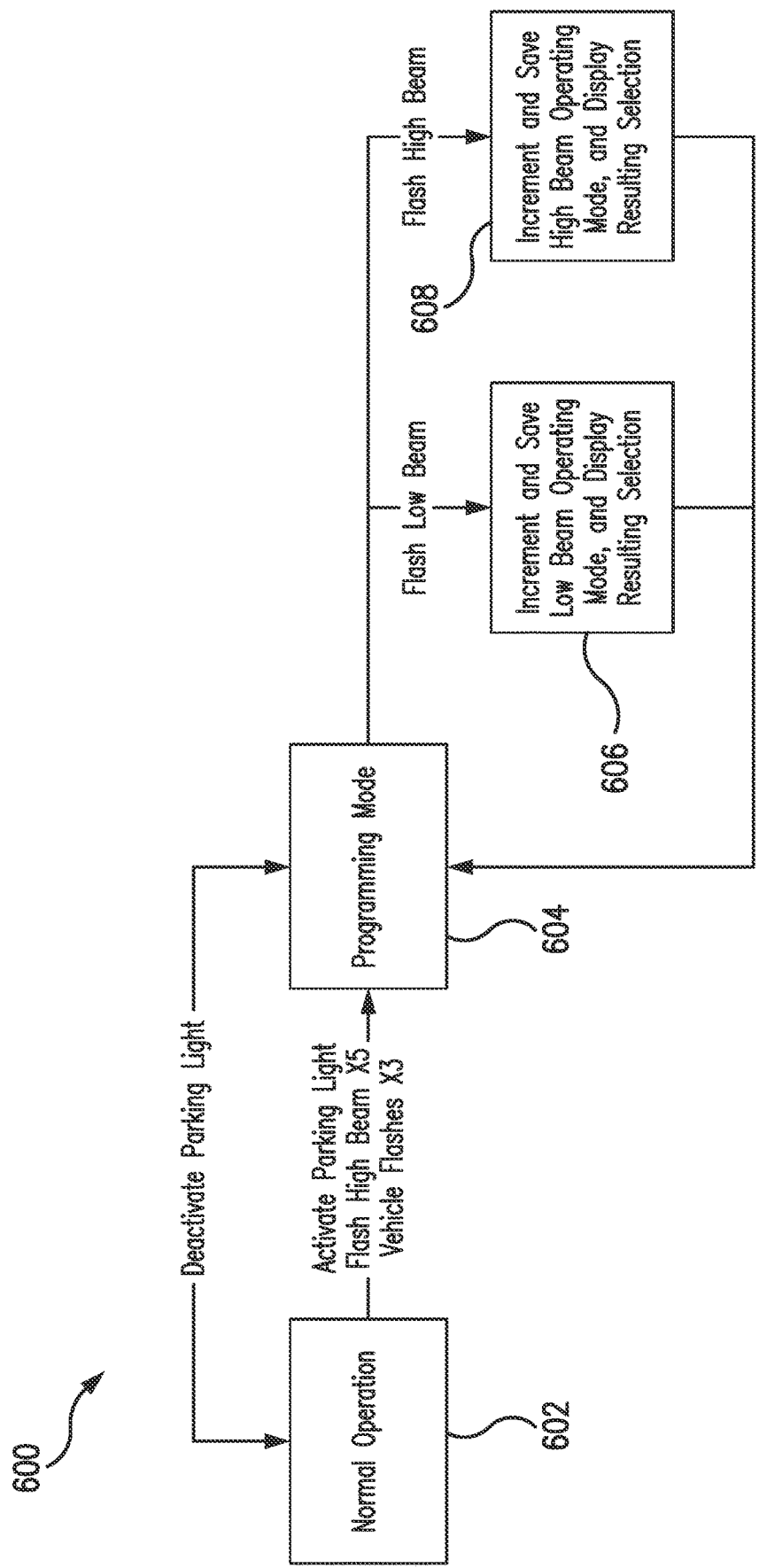
FIG. 6 is a flow diagram of another example control method that may be implemented in connection with the lamp assembly of FIG. 1.

In the illustrated embodiment of FIG. 6, the method 600 provides selectable options for individually controlling a specific operating mode of the low beam headlights and/or the high beam headlights. For example, a user may select between three operating mode options for the low beam headlights and three operating mode options for high beam headlights. The operating mode options for the low and/or high beam headlights may include, for example, a standard beam, an adaptive beam, an extra-wide beam, a cornering beam, etc. Like in the method 500 of FIG. 5, the method 600 of FIG. 6 allows a user to provide successive individual inputs to direct changes in an operating parameter of a corresponding lighting function, rather than collecting controlling configurations of multiple operating parameters as in the method 400 of FIG. 4.

The method 600 begins at 602 where the controller 102 is in its normal operating mode. Next, the user selects two factory installed input devices and the controller 102 captures corresponding input signals, whereby the captured input signals are equivalent to an input signal sequence, as explained above. The input signal sequence of FIG. 6 may be similar to the input signal sequence described above relative to FIG. 4. For example, in FIG. 6, the user activates the parking lights and then repeatedly activates and deactivates the high beam headlights five times.

If the input signal sequence corresponds to the programming sequence 120, the controller 102 may generate one or more control signals to cause one or more controllable lights (e.g., the parking lights, etc.) to flash, for example, three times, thereby indicating a programming sequence has been successfully entered. Additionally, at this time, the controller 102 is also in a programming mode, as depicted in 604. The controller 102 remains in the programming mode until the parking lights are deactivated (e.g., power to the controller 102 is removed, etc.) as explained above.

While the controller 102 is in the programming mode, a user may modify the operating mode of the low beam headlights and/or the high beam headlights by selecting different factory installed input devices. The selection of the factory installed input devices provide different input control signals to the controller 102 which in turn causes the controller 102 to modify associated operating variables. For example, the user may cycle power to the low beam headlights to increment the operating mode of the low beam headlights in 606. Similarly, the user may cycle power to the high beam headlights to increment the operating mode of the high beam headlights in 608. In some embodiments, the controller 102 may immediately save the changes and generate a control signal to cause the low and/or high beam high headlights to activate with the user-selected operating modes, as depicted in 606, 608. If the user wishes to increment to the next operating mode, the user may cycle power to the low and/or the high beam headlights again.

Figure 7:
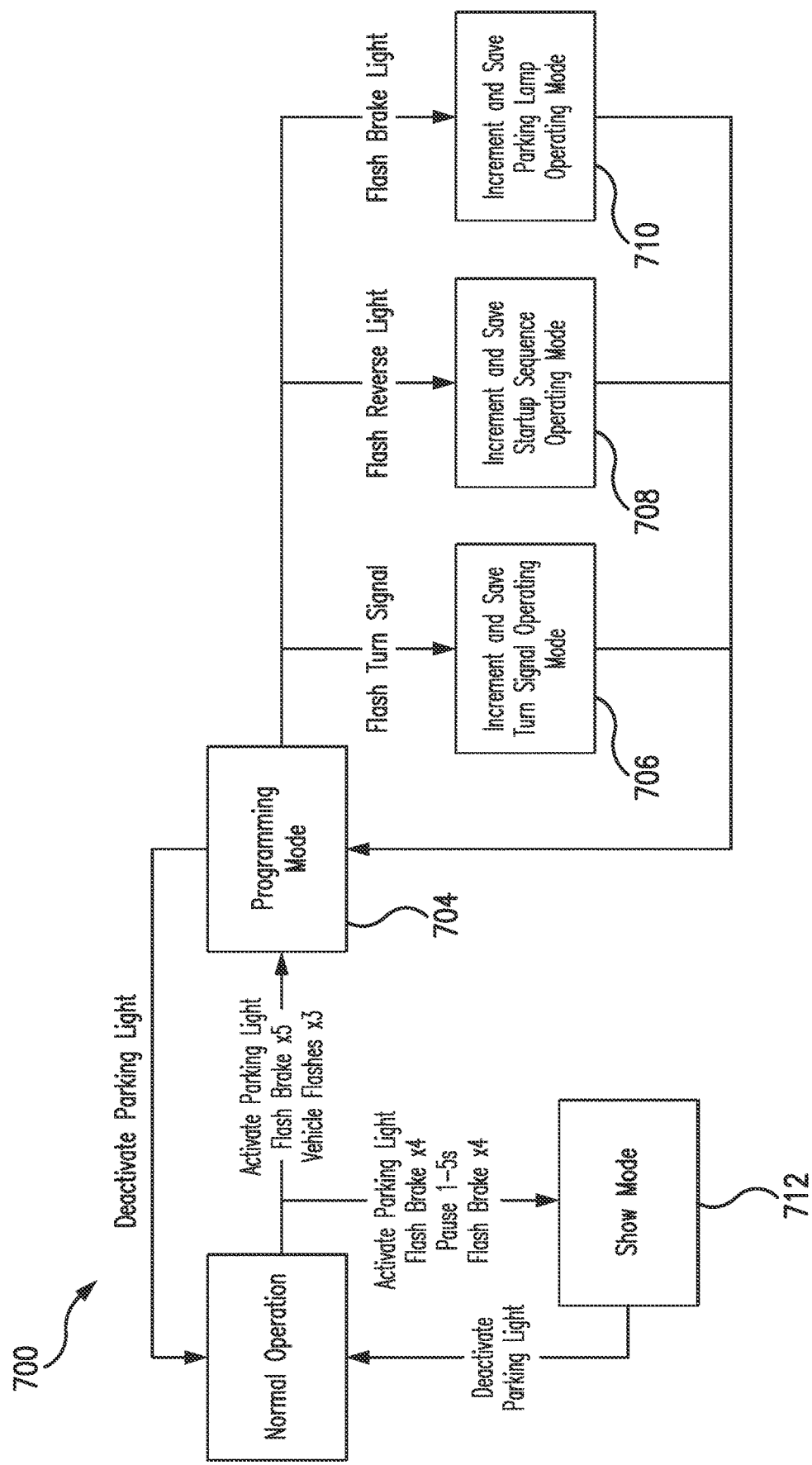
FIG. 7 is a flow diagram of another example control method that may be implemented in connection with the lamp assembly of FIG. 1.

In the illustrated embodiment of FIG. 7, the method 700 provides selectable options for individually controlling the enablement/disablement of a sequential turn signal function and a startup sequence, and the modification of the number of illuminated sections of the parking lights between, for example, one and four. In the example of FIG. 7, the method 700 allows a user to provide successive individual inputs to direct changes in an operating parameter of a corresponding lighting function, rather than collecting controlling configurations of multiple operating parameters as in the method 400 of FIG. 4.

The method 700 begins at 702 where the controller 102 is in its normal operating mode. Next, the user selects two factory installed input devices and the controller 102 captures input signals corresponding to an input signal sequence as explained herein. The input signal sequence of FIG. 7 may be similar to the input signal sequence described above relative to FIG. 4. For example, in FIG. 7, the user activates the parking lights and then repeatedly activates and deactivates the brake lights five times.

If the input signal sequence corresponds to the programming sequence 120, the controller 102 may generate one or more control signals to cause one or more controllable lights (e.g., the parking lights, turn signals, etc.) to flash, for example, three times, thereby indicating a programming sequence has been successfully entered. Additionally, at this time, the controller 102 is also in a programming mode, as depicted in 704. The controller 102 remains in the programming mode until the parking lights are deactivated (e.g., power to the controller 102 is removed, etc.) as explained above.

While the controller 102 is in the programming mode, a user may modify the sequential turn signal feature, the startup sequence, and illumination of the parking lights by selecting different factory installed input devices. The selection of the factory installed input devices provide different input control signals to the controller 102 which in turn causes the controller 102 to modify associated operating variables. For example, the user may alternate selection of the sequential turn signal function in 706 by activating and deactivating the turn signal using the hazard button. The user may also alternate selection of the startup sequence in 708 by cycling power three times to the reverse lights (e.g., backup lights, etc.), waiting at least one but less than five seconds, and then cycling power three times to the reverse lights again. Further, the user may increment through different illuminated patterns of the parking light in 710 by cycling power to the brake lights. In some examples, the controller 102 may generate one or more control signals to cause the brake lights to display the selected illumination pattern after each successive flash of the brake lights. The controller 102 may also immediately save the changes and generate a control signal to cause particular lights (e.g., the parking lights, the reverse lights, etc.) to flash, for example, three times to indicate successful programming.

Additionally, and similar to the method 400 of FIG. 4, the method 700 of FIG. 7 may include a show mode option. For example, the user may select multiple factory installed input devices to provide another input signal sequence to the controller 102. For instance, in FIG. 7, the user may activate the parking lights, repeatedly activate/deactivate the brake lights four times, pause for one second, and then repeatedly activate/deactivate the brake lights (again) four times. If the input signal sequence corresponds to a stored show sequence, the controller 102 may be in a show mode as depicted in 712. When in the show mode, the controller 102 generates one or more control signals to cause the brake lights to present a show by displaying various lighting animations. This may continue until the parking lights are deactivated. The method 700 then returns to 702 where the controller 102 is in its normal operating mode.

Figure 8:
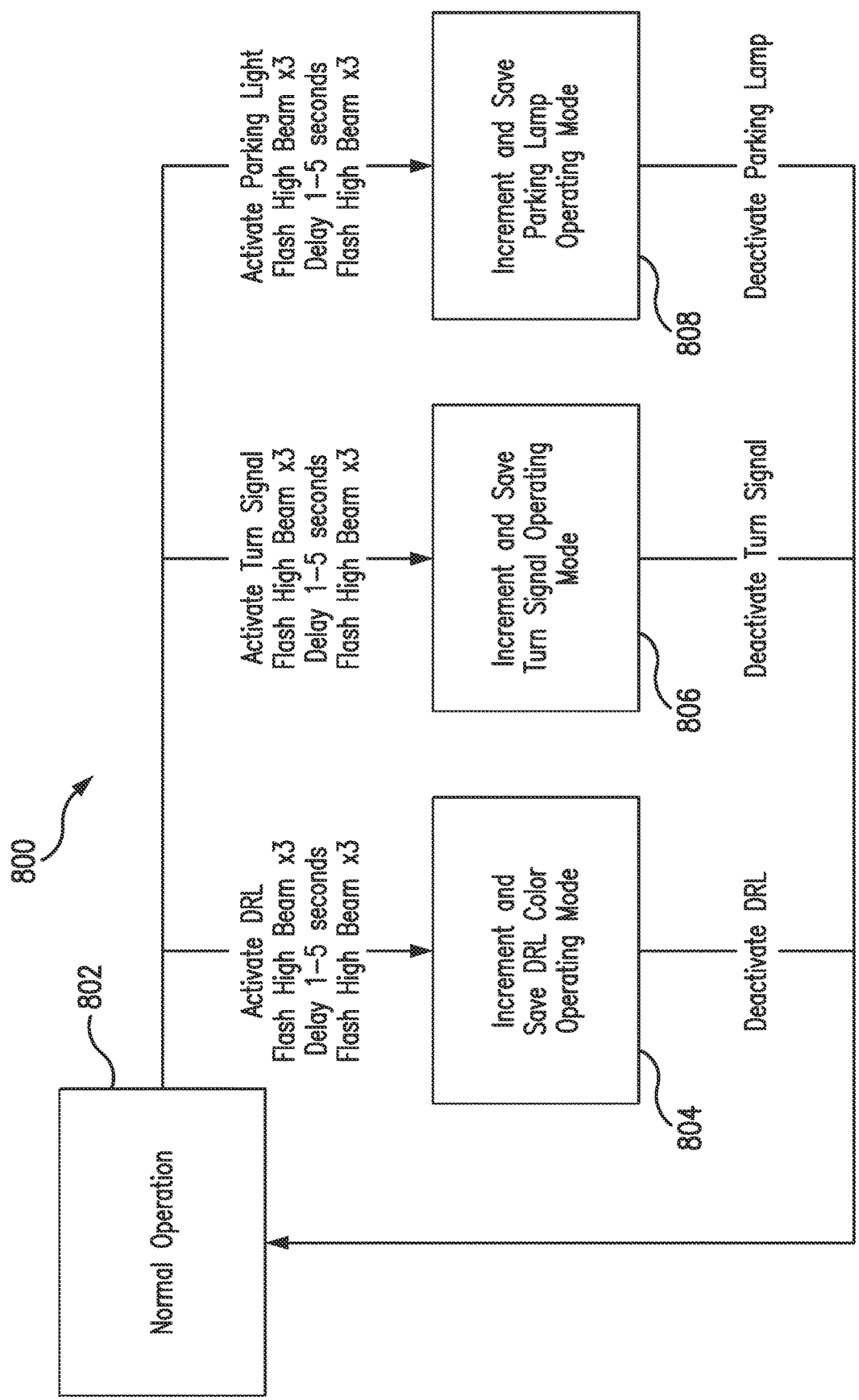
FIG. 8 is a flow diagram of another example control method that may be implemented in connection with the lamp assembly of FIG. 1.

In the illustrated embodiment of FIG. 8, the method 800 provides selectable options for individually controlling the color of DRLs, and the enablement/disablement of a sequential turn signal function and a startup sequence. Like the methods 500, 600, 700 of FIGS. 5-7, the method 800 of FIG. 8 allows a user to provide successive individual inputs to direct changes in an operating parameter of a corresponding lighting function, rather than collecting controlling configurations of multiple operating parameters as in the method 400 of FIG. 4. However, unlike the methods 400, 500, 600, 700 of FIGS. 4-7, the method 800 of FIG. 8 does not rely on the controller 102 being in a programming mode to direct changes in an operating parameter.

The method 800 begins at 802 where the controller 102 is in its normal operating mode. During this time, all vehicle lighting functions may be deactivated such that the controller 102 is not powered. Next, the user may select different factory installed input devices and provide different input signal sequences and input control signals to the controller 102.

For example, the user may alternate selection of the color of the DRLs in 804 by activating the DRLs, cycling power to the high beam headlights three times, waiting at least one but less than five seconds, and then cycling power to the high beam headlights (again) three times. In such examples, the activation of the DRLs and the first power cycling to the high beam headlights may represent an input signal sequence provided to the controller 102, and the second power cycling to the high beam headlights may represent an input control signal provided to the controller 102. In such examples, if the input signal sequence corresponds to a programming sequence, the controller 102 increments and saves the operating variable corresponding to the color of the DRLs based on the input control signal. This incrementation may continue until the DRLs are deactivated. The method 800 then returns to 802 where the controller 102 is in its normal operating mode.

The enablement/disablement of the sequential turn signal function may be accomplished in a similar manner as the color selection of the DRLs. For example, the user may enable/disable the sequential turn signal function in 806 by activating the turn signals, cycling power to the high beam headlights three times, waiting at least one but less than five seconds, and then cycling power to the high beam headlights (again) three times. In such examples, the activation of the turn signals and the first power cycling to the high beam headlights may represent another input signal sequence provided to the controller 102, and the second power cycling to the high beam headlights may represent another input control signal provided to the controller 102. If the input signal sequence corresponds to a programming sequence, the controller 102 increments and saves the operating variable corresponding to the sequential turn signal function based on the input control signal. This incrementation may continue until the turn signals are deactivated. The method 800 then returns to 802.

The enablement/disablement of the startup sequence may be accomplished in a similar manner as explained above. For example, the user may enable/disable the startup sequence in 808 by activating the parking lights, cycling power to the high beam headlights three times, waiting at least one but less than five seconds, and then cycling power to the high beam headlights (again) three times. The activation of the parking lights and the first power cycling to the high beam headlights may represent another input signal sequence provided to the controller 102, and the second power cycling to the high beam headlights may represent another input control signal provided to the controller 102. If the input signal sequence corresponds to a programming sequence, the controller 102 increments and saves the operating variable corresponding to the startup sequence based on the input control signal. This incrementation may continue until the parking lights are deactivated. The method 800 then returns to 802.

In the method 800 of FIG. 8, the controller 102 may provide an indication of successful programming. For example, the controller 102 may generate one or more control signals to cause the particular lights (e.g., the parking lights, the turn signals, etc.) to flash, for example, three times to indicate each time the operating parameter is changed.

As used herein, operating parameters may represent controllable output characteristics of the light sources. For example, the operating parameters may represent light color, light intensity (e.g., color, brightness, etc.), etc. Further, the operating parameters may represent operating modes such as light activation modes (e.g., continuous, strobe, etc., modes), light activation timing (e.g., when to activate, the speed of activation, etc.), adaptive directionality (e.g., cornering or steering controls, etc.), frequency of light activation (e.g., the speed in which the light sources turn on and off, etc.), selective activation of some light sources over other light sources (e.g., to control beam pattern, directionality, total intensity, effective output color, the illumination of a selective portions of a light source, etc.), etc. If the light sources herein are employed in a vehicle, such control of the operating parameters of the light sources may allow for the selection of the above-mentioned dynamic lighting effects with respect to daytime running lights, main beams, dome lights, light bars, turn signals, etc. In such examples, the operating parameters may include characteristics such as a speed and style of a sequential turn signal animation feature, a speed and style of a welcome or activation lighting animation, and the behavior of one or more light sources when certain inputs are applied, such as the behavior of the light sources when an automatic high-beam or an auxiliary lighting function is enabled and the behavior of the light sources during activation based on, for example, a travel speed, a steering angle, a vehicle angle, the connection of another light source to the same circuit, etc.

Additionally, the sequences disclosed herein may be defined in a manner to substantial prevent undesired modifications of operating variables. For example, the input signal sequence may correspond to a specific and methodical sequence of certain input devices and modification of the operating variables is only completed if the input signal sequence corresponds to the defined programming sequence. Due to this multi-step requirement to modify the operating variables, there may be a limited possibility that a user will modify the operating variables by accident (e.g., during the course of regular driving, etc.).

Further, in some examples, the modification of the operating variables may be unavailable while the vehicle is under ignition power and/or moving. For example, the controller may be configured to capture an input signal from a speedometer, a GPS device, and/or another device suitable for sensing movement. In other examples, the controller may be configured to capture an input signal that specifically indicates that the vehicle is under ignition power, such as an existing vehicle ignition signal. The vehicle ignition signal may be captured via existing factory installed components and/or aftermarket installed components. In response to capturing the input signal, the controller may be configured to prevent modification of the operating variables (e.g., prevent the comparison between a programming sequence and an input signal and programming sequence, etc.).

In view of the above, the lamp assemblies and methods herein enable controllers (e.g., microcontrollers, etc.) adjust one or more operating parameters of aftermarket light sources of a vehicle through input signals from user selection of factory installed input devices in the vehicle. In this manner, configuration of the controller and the aftermarket light sources is accomplished through selection of existing, previously installed input devices such as control devices within a vehicle (e.g., in a cab, interior portion, etc. of the vehicle). As such, aftermarket devices such as switches, control panels, wiring harnesses, wireless devices, etc. are not required for configuration of the controller to adjust operating parameters of aftermarket light sources. Additionally, because the control devices may be within the vehicle, users are not required to exit the vehicle to adjust the operating parameters. Thus, the lamp assemblies and methods herein provide for a cost-effective and convenient solution for modifying operating parameters through the use of factory installed controls It should be appreciated that the functions described herein, in some embodiments, may be described in computer executable instructions stored on a computer readable media, and executable by one or more processors. The computer readable media is a non-transitory computer readable storage medium. The computer readable media and one or more processors may be components of one of the controllers herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lamp assembly for a vehicle, the lamp assembly comprising:
    at least one controllable aftermarket light source; and
    a controller coupled to the at least one controllable aftermarket light source, the controller including a storage medium configured to store a defined sequence and an operating variable, the controller configured to:
        capture an input signal sequence via at least one first factory installed input device in a vehicle;
        determine whether the input signal sequence corresponds to the defined sequence stored in the storage medium;
        capture an input control signal via at least one second factory installed input device in the vehicle, the at least one second factory installed input device being the same as or different than the at least one first factory installed input device; and
        in response to determining the input signal sequence corresponds to the defined sequence, modify an operating variable stored in the storage medium based on the input control signal, the operating variable associated with one or more operating parameters of the controllable aftermarket light source in the vehicle.

2. The lamp assembly of claim 1, wherein the controller is configured to, in response to determining the input signal sequence corresponds to the defined sequence, modify a value of a programming variable stored in the storage medium.

3. The lamp assembly of claim 2, wherein the controller is configured to capture a deactivation signal via one of the at least one first and the at least one second factory installed input devices, and in response to the deactivation signal, reset the value of the programming variable to a default value.

4. The lamp assembly of claim 1, wherein the at least one first factory installed input includes multiple different factory installed input devices.

5. The lamp assembly of claim 4, wherein the at least one second factory installed input device is different than the multiple different factory installed input devices.

6. The lamp assembly of claim 4, wherein the at least one second factory installed input device is the same as one of the multiple different factory installed input devices.

7. The lamp assembly of claim 1, wherein the controller is configured to provide a control signal consistent with the modified operating variable to the controllable aftermarket light source.

8. The lamp assembly of claim 1, wherein the defined sequence is a first defined sequence, wherein the storage medium is configured to store a second defined sequence, and wherein the controller is configured to:
    determine whether the input signal sequence corresponds to the second defined sequence stored in the storage medium; and
    in response to determining the input signal sequence corresponds to the second defined sequence, provide one or more control signals to the controllable aftermarket light source, thereby causing the controllable aftermarket light source to activate according to a defined operating mode.

9. A vehicle comprising one or more factory installed input devices and the lamp assembly of claim 1 coupled to the one or more factory installed input devices.

10. The vehicle of claim 9, wherein the one or more factory installed input devices include at least one of a turn signal switching device, a headlight switching device, a high beam switching device, a parking light switching device, an auxiliary light switching device, a day time running light switching device, a brake light switching device, and a reverse light switching device.

11. A method for controlling one or more operating parameters of a controllable aftermarket light source of a vehicle, the vehicle including a plurality of factory installed input devices, the method comprising:
  capturing, by a controller, an input signal sequence via at least one first factory installed input device in the vehicle;
  determining, by the controller, whether the input signal sequence corresponds to a defined sequence stored in a storage medium associated with the controller;
  capturing, by the controller, an input control signal via at least one second factory installed input device in the vehicle, the at least one second factory installed input device being the same as or different than the at least one first factory installed input device; and
  in response to determining the input signal sequence corresponds to the defined sequence, modifying an operating variable stored in the storage medium based on the input control signal, the operating variable associated with one or more operating parameters of the controllable aftermarket light source.

12. The method of claim 11, further comprising, in response to determining the input signal sequence corresponds to the defined sequence, modifying a value of a programming variable stored in the storage medium.

13. The method of claim 12, further comprising:
  capturing, at the controller, a deactivation signal via one of the plurality of factory installed input devices; and
  in response to the deactivation signal, resetting the value of the programming variable to a default value.

14. The method of claim 11, wherein the at least one first factory installed input includes multiple different factory installed input devices.

15. The method of claim 14, wherein the at least one second factory installed input device is different than the multiple different factory installed input devices.

16. The method of claim 14, wherein the at least one second factory installed input device is the same as one of the multiple different factory installed input devices.

17. The method of claim 11, further comprising providing a control signal consistent with the one or more modified operating variables to the controllable aftermarket light source.

18. The method of claim 11, wherein the defined sequence is a first defined sequence, and wherein the method further comprises:
  determining, by the controller, whether the input signal sequence corresponds to a second defined sequence stored in the storage medium; and
  in response to determining the input signal sequence corresponds to the second defined sequence, providing one or more control signals to the one or more controllable aftermarket light sources, thereby causing the one or more controllable aftermarket light sources to activate according to a defined operating mode.

* * * * *